INVENTORS
MICHAEL E. HANEY
BY MARVIN M. HOEHN
JAMES M. McGUIRE

*Walter E. Buting* ATTORNEY

United States Patent Office 3,501,568
Patented Mar. 17, 1970

3,501,568
NOVEL ANTIBIOTIC A3823 COMPLEX AND PROCESS FOR PRODUCTION THEREOF
Michael E. Haney, Lafayette, and Marvin M. Hoehn and James M. McGuire, Indianapolis, Ind., assignors to Eli Lilly and Company, Indianapolis, Ind., a corporation of Indiana
Continuation-in-part of application Ser. No. 399,706, Sept. 28, 1964. This application Oct. 24, 1968, Ser. No. 770,280
Int. Cl. A61k 21/00; C07g 11/00
U.S. Cl. 424—115
8 Claims

ABSTRACT OF THE DISCLOSURE

Antibiotic and coccidiostatic complex A3823 comprising four factors produced by fermentation of *Streptomyces cinnamonensis* ATCC 15413 and fractionation of the product so obtained.

Cross reference

This application is a continuation-in-part of our copending application, Ser. No. 399,706 filed on Sept. 28, 1964 and now abandoned.

This invention relates to a novel antibiotic substance and to its preparation. More particularly, this invention relates to a novel antibiotic complex designated herein as A3823 and to the individual antibiotics comprising the said complex.

The novel antibiotic complex of this invention comprises four factors, each having antibiotic activity.

The novel antibiotic complex provided by this invention is a crystalline white solid melting at about 103–106° C. It is soluble in most of the common organic solvents, such as the lower alcohols, lower esters, ketones, chloroform, dimethylformamide, dimethyl sulfoxide, and the like. It is extremely insoluble in water. The antibiotic complex, A3823, undergoes a rapid change in acidic solution with subsequent loss of activity. In basic solution, however, the antibiotic complex demonstrates a remarkable degree of stability. Thus, for example, a sample of the complex heated under reflux at pH 11 for 60 hours underwent no apparent change except for the formation of the salt of the acid. When stored as the dry crystalline material, A3823 complex remains stable for prolonged periods of time.

In methanol solution, at a temperature of 25° C., the specific rotation of sodium D light by A3823 complex is +47.7° when the concentration of the antibiotic is 1 percent on a weight per volume basis.

Figure 1:
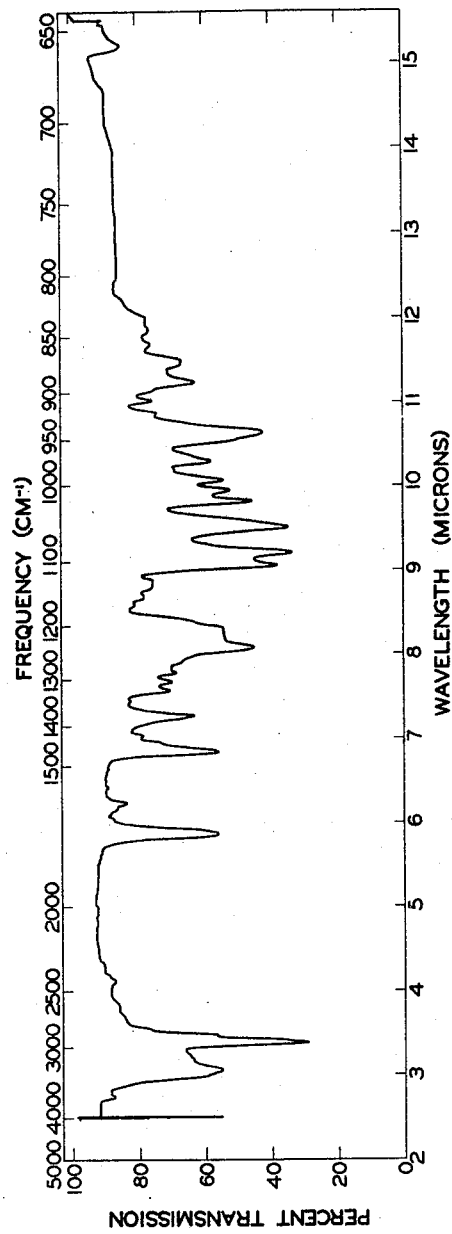

Electrometric titration of antibiotic complex A3823 in 66 percent aqueous dimethylformamide shows the presence of one titratable group having a pK'a of 6.65. The antibiotic complex does not absorb ultraviolet radiation to a significant extent. The nuclear magnetic resonance spectrum suggests the presence of one carboxyl group, three to four hydroxyl groups, and an ether linkage. The infrared absorption spectrum of the antibiotic complex, A3823, in chloroform solution with a 0.1 mm. cell path is shown in FIGURE 1. The distinguishable bands in the infrared absorption spectrum over the range of 2.0 to 15.0 microns are as follows: 2.73, 2.98 (shoulder), 3.05, 3.38, 3.47, 5.86, 6.23, 6.83, 7.02, 7.26, 7.56, 7.66, 7.76, 8.04, 9.02, 9.17, 9.47, 9.78, 9.91, 10.06, 10.25, 10.58, 10.82, 10.98, 11.21, 11.44, 11.64, 11.82, and 11.97 microns.

A powder X-ray diffraction pattern of the antibiotic complex using chromium radiation with a vanadium filter for calculating the interplanar spacings gives values as follows:

| d: | $I/I_1$ | d: | $I/I_1$ |
|---|---|---|---|
| 13.01 | .05 | 5.19 | .70 |
| 11.88 | .10 | 4.93 | .60 |
| 9.70 | .80 | 4.65 | .50 |
| 9.39 | .90 | 4.47 | .10 |
| 8.68 | .50 | 4.26 | .60 |
| 8.20 | .20 | 3.97 | .10 |
| 7.93 | .20 | 3.77 | .05 |
| 7.50 | .20 | 3.58 | .05 |
| 7.21 | .80 | 3.53 | .05 |
| 7.01 | 1.00 | 3.44 | .05 |
| 6.39 | .90 | 3.32 | .05 |
| 5.47 | .90 | 3.17 | .05 |
| 5.36 | .05 | | |

Qualitative tests carried out with A3823 complex suggest that no reduced or amino sugars are present. The steroid and gluconic acid tests are likewise negative.

Antibiotic A3823 complex has an inhibitory action against the growth of bacteria and fungi which are pathogenic to animal and plant life. The inhibitory concentrations, determined by the agar dilution test, for a number of organisms are shown in Table I.

TABLE I

| Test organism | Minimum inhibitory concentration (mcg./ml.) | | |
|---|---|---|---|
| | 24 hrs. | 48 hrs. | 72 hrs. |
| Staphylococcus aureus | <.78 | <.78 | |
| Bacillus subtilis | 1.56 | 1.56 | |
| Mycobacterium avium | | <.78 | |
| Streptococcus faecalis | 3.13 | 12.5 | |
| Lactobacillus casei | <.78 | <.78 | |
| Leuconostoc citrovorum | <.78 | 3.13 | |
| Proteus sp. No. 1 | 50 | >100 | |
| Vibrio metschnikovii | 50 | 50 | |
| Alternaria solani | | | 6.25 |
| Botrytis cinerea | | | 3.13 |
| Colletotrichum pisi | | | 12.5 |
| Glomerella cingulata | | | 100 |
| Helminthosporium sativum | | | 50 |
| Polyporus ostreatus | | | 25 |
| Penicillium expansum | | | 12.5 |
| Pullularia sp | | | 1.56 |
| Sclerotinia fructicola | | | 3.13 |
| Verticillium albo-atrum | | | 100 |
| Spicaria divaricata | | | 100 |

The antibiotic complex provided by this invention exhibits a variety of interesting and useful properties. Thus for example, its antibiotic spectrum, as above presented, is such that it is useful in suppressing the growth of a number of important bacteria and fungi which may be pathogenic to animal and plant life. In addition, the complex exhibits a high degree of activity against a variety of neoplastic growths in tissue culture. Still another important property of the complex is its ability to prevent the development of coccidiosis in poultry. Thus for example, A3823 complex, present in the feed of young chickens at levels as low as 0.02 percent is highly effective in preventing mortality and in decreasing the number of lesions in chicks which have been challenged with various species of coccidia. The results observed with four of the species are shown in Table II.

TABLE II.—ACTIVITY OF ANTIBIOTIC A3823 COMPLEX AGAINST FOUR SPECIES OF COCCIDIA

| Infecting organism | Drug level in feed, percent by weight | No. of Chickens | Mortality, percent | Weight gain, g. |
|---|---|---|---|---|
| Eimeria tenella | .02 | 19 | 0 | 1,778 |
| | Control | 50 | 36 | 133 |
| Eimeria necatrix | .02 | 30 | 0 | 4,128 |
| | Control | 50 | 48 | −98 |
| Eimeria maxima | .02 | 50 | 0 | 8,508 |
| | Control | 50 | 0 | 7,100 |
| Eimeria brunetti | .02 | 20 | 0 | 1,490 |
| | Control | 20 | 0 | 935 |

The acute toxicity of the antibiotic complex A3823 in mice, expressed as $LD_{50}$, is about $43.8 \pm 5.2$ mg./kg. of body weight when the complex is administered orally; intraperitoneally, the $LD_{50}$ is about $16.8 \pm 1.7$ mg./kg. of body weight. The antibiotic complex appears to be much less toxic in chickens, the acute oral toxicity in that species, again expressed as $LD_{50}$, being about $284.45 \pm 47.22$ mg./kg. of body weight.

As noted above, the antibiotic complex A3823 comprises four distinct factors. As employed hereinabove, the term A3823 is used to designate the antibiotic complex, while the several factors comprising the complex will be designated as A3823 factor A, A3823 factor B, A3823 factor C and A3823 factor D. In the complex as commonly obtained, the most prevalent of the several factors appear to be factor A and factor B. The remaining constituents, factor C and factor D commonly occur in substantially lower amounts so as to render their isolation and purification unrewarding. For example, factor A and factor B constitute about 85–95 percent of the complex. A3823 factor D is the least prevalent of the several factors, constituting only about one percent of the complex.

The four antibiotic factors comprising the complex A3823 have been separated and characterized, descriptions of the properties thereof being contained in the following paragraphs.

Antibiotic A3823 factor A is a white crystalline compound of the formula:

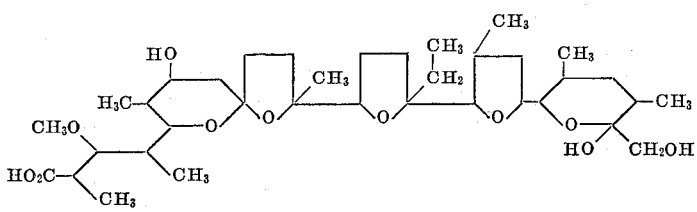

Figure 2:
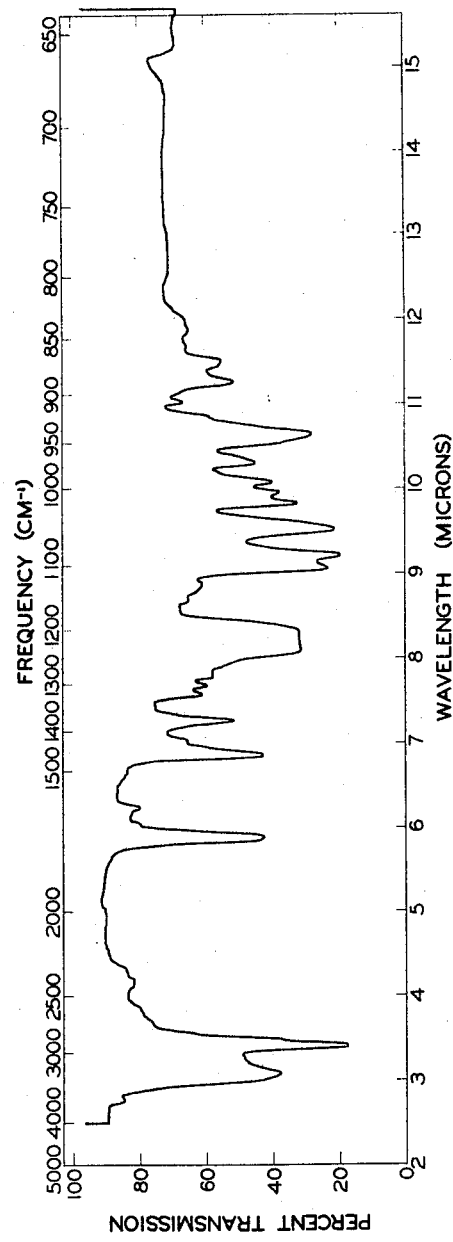

The free acid form of A3823 factor A has a melting point of about 103–105° C. The sodium salt has a melting point of about 267 to 269° C. The free acid form is soluble in most common organic solvents, for example, the lower alcohols such as methanol, ethanol, isopropanol and the like; the lower ketones such as acetone, diethyl ketone, methyl isobutyl ketone and the like; the lower esters such as ethyl acetate, methyl propionate and the like; the chlorinated hydrocarbons such as chloroform, ethylene dichloride and the like, dimethyl formamide, and dimethyl sulfoxide. It is highly insoluble in water. Factor A exhibits essentially no ultraviolet absorption above 210 m$\mu$. The infrared absorption spectrum of factor A free acid in chloroform is shown in FIGURE 2 of the accompanying drawings. The distinguishable bands in the infrared absorption spectrum over the range of 2.0 to about 15 microns are as follows: 2.76, 3.09, 3.41, 3.69, 3.85, 5.89, 6.03, 6.24, 6.86, 7.03, 7.27, 7.57, 7.67, 7.8, 8.2, 8.70, 8.88, 9.06, 9.21, 9.52, 9.82, 9.94, 10.07, 10.29, 10.63, 11.02, 11.26, 11.47, 11.68 and 11.9 microns.

The molecular formula of antibiotic A3823 factor A, as derived from the high-resolution mass spectrum of its sodium salt, is $C_{36}H_{62}O_{11}$. The molecular weight derived by the same method, 670.

Electrometric titration of antibiotic A3823 factor A in 66 percent aqueous dimethylformamide shows the presence of one titratable group having a pK'a of about 6.6.

The structure of antibiotic A3823 factor A is determined by X-ray crystallographic analysis of its silver salt. The nuclear magnetic resonance spectrum, infrared absorption spectrum and mass spectrometric spectrum data are in agreement with the structure.

Factor A forms a diacetyl derivative on reaction with acetic anhydride and pyridine. The molecular formula of the diacetyl derivative is $C_{40}H_{66}O_{13}$. The derivative has a pK'a value of 7.60 in 66 percent aqueous dimethylformamide as determined by electrometric titration. The diacetyl derivative of factor A forms a crystalline methyl ester on reaction with diazomethane in ether. The diacetyl methyl ester has a melting point of about 113–114° C.

Antibiotic A3823 factor B is a crystalline compound of the formula:

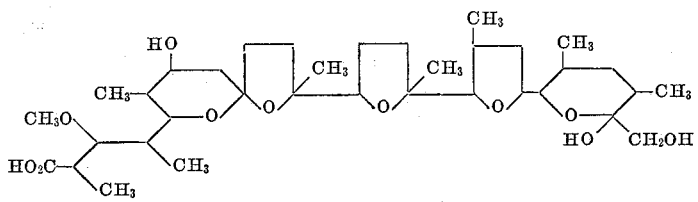

The sodium salt of factor B has a melting point of about 227–228° C. Electrometric titration of the free acid form of factor B in 66 percent aqueous DMF gives a pK'a value of 5.9.

Figure 3:
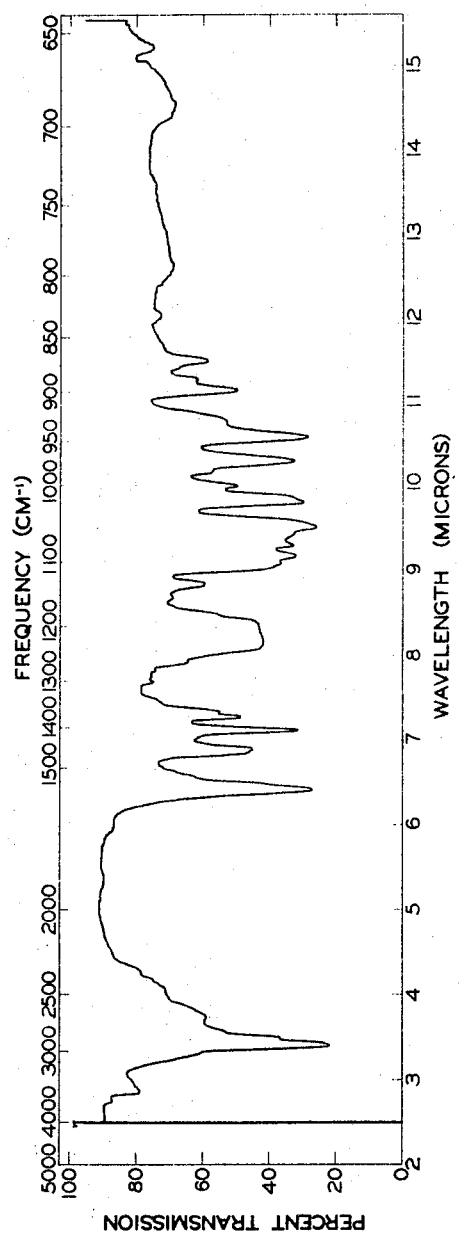

The infrared absorption spectrum of the sodium salt in chloroform is shown in FIGURE 3 of the drawings. The following absorption peaks are discernible in the range of 2.0 to 15.0 microns: 2.76, 2.86, 3.41, 3.49, 3.57, 3.74, 6.42, 6.56, 6.90, 7.12, 7.29, 7.34, 7.69, 7.82, 7.92, 8.2, 8.47, 8.68, 8.84, 9.09, 9.18 9.30, 9.43, 9.51, 9.81, 10.00, 10.17, 10.30, 10.59, 10.77, 11.14, 11.26, 11.48 and 12.03 microns.

Antibiotic A3823 factor B is essentially transparent to ultraviolet light.

The molecular weight of A3823 factor B, as calculated from mass spectrometric data on the sodium salt, is 656. Elemental microanalysis of the sodium salt indicates the following approximate percentage composition for A3823 factor B: C, 61.86; H, 8.80; O, 26.84 (by difference); Na, 2.50.

Factor B is soluble in most of the common organic solvents such as the lower alcohols, lower esters, lower ketones, dimethylformamide, diethylether and dimethylsulfoxide. It is highly insoluble in water.

The infrared spectrum, nuclear magnetic resonance spectrum and the mass spectral analysis data are in agreement with the structure shown above.

Antibiotic A3823 factor C is a crystalline monocarboxylic acid having a molecular weight of 684 as determined by mass spectral analysis of its sodium salt. Factor C in the form of its sodium salt has a melting point of about 212–214° C. Factor C is soluble in most of the common organic solvents such as the lower alcohols, the lower esters, the lower ketones, ethers such as diethyl ether, dimethylformamide, and dimethylsulfoxide and is highly insoluble in water.

Figure 4:
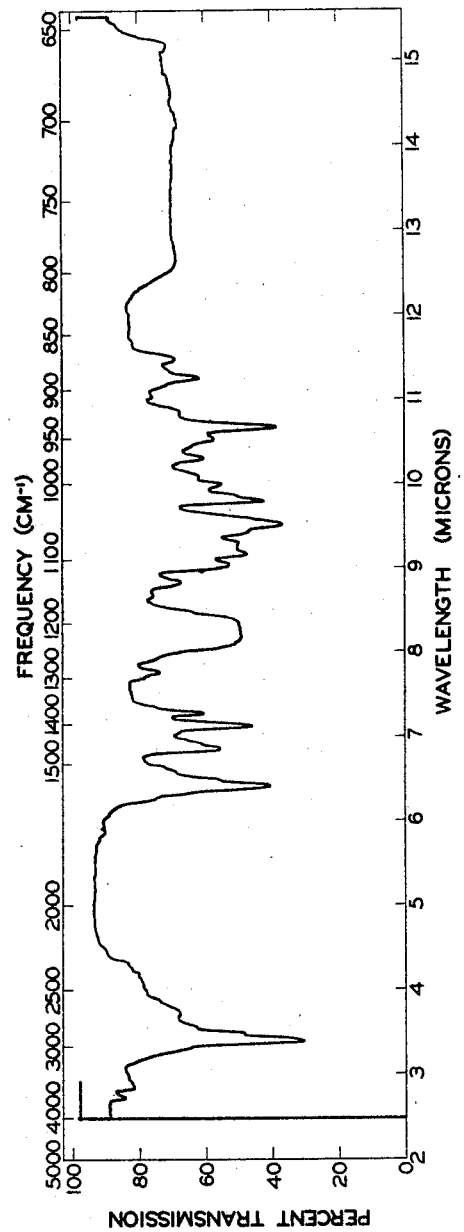

The infrared absorption spectrum of the sodium salt of factor C in chloroform is shown in FIGURE 4 of the drawings. The following absorption peaks are distinguishable in the spectrum: 2.74, 2.86, 3.40, 3.48, 3.57, 3.73, 6.27, 6.41, 6.48, 6.57, 6.62, 6.85, 7.12, 7.27, 7.76, 8.2, 8.47, 8.67, 8.83, 9.04, 9.16, 9.29, 9.43, 9.51, 9.79, 9.85, Because of the uncertainty of taxonomic studies with the Streptomyces group of organisms, there is always an element of doubt associated with the classification of a newly discovered organism. However, the organism which produces the antibiotic complex A3823 appears to resemble most nearly in the most important characteristics *Streptomyces cinnamonensis* Okami (NRRL B1588) and is considered to be a novel strain thereof. Sufficient differences exist between our strain of *S. cinnamonensis* and the previously known strain to require that the organism described in the present invention be characterized as a new strain. The two strains resemble one another in spore chain and spore morphology, in the color of the aerial and vegetative mycelium produced, and in the presence of soluble pigment. However, the strains differ in the utilization of nine carbon sources, in the production of hydrogen sulfide by *S. cinnamonensis* (NRRL B1588) and the lack of production thereof by the present novel strain, and most dramatically in their temperature requirements. Thus, for example, with *S. cinnamonensis* (NRRL B1588) maximum growth and sporulation occurs at 26° C. Only fair sporulation occurs at 30° C. Growth continues, but without sporulation, at 37° C. and growth is entirely suppressed at 43° C. In contrast, the presently employed strain of *S. cinnamonensis* ATCC 15413 undergoes maximum growth and sporulation between 30 and 37° C. Fair growth, although with scant sporulation, still occurs at 43° C., a temperature at which growth is entirely absent with the formerly known strain.

The organism which produces the antibiotic complex, A3823 was isolated from a soil sample by suspending portions of the soil in sterile distilled water and streaking the suspension on nutrient agar. The seeded agar plates were incubated at 25–35° C. until visible colonies were observed. At the end of the incubation period, colonies of the antibiotic-producing organisms were transferred by means of a sterile platinum loop to agar slants. The slants were then incubated to provide suitable quantities of inoculum for the production of A3823.

The methods employed in the taxonomic studies of the A3823-producing strain of *S. cinnamonensis* ATCC 15413 are those commonly used in the taxonomy of the actinomyces. Carbon utilization tests were carried out in accordance with the method described in Pridham and Gottlieb, J. Bact., 56, 107 (1948). In the paragraphs which follow are summarized the results of the taxonomic studies. The numbers in parentheses refer to color blocks in Maerz and Paul's Dictionary of Color, (1950). All cultures were grown at 30° C. Morphological and cultural characteristics were determined after 14 days' incubation. Tomato paste-oatmeal agar and Czapek's agar were employed to study the morphology of the cultures. Nitrate reduction and gelatin liquefaction were determined at 7 and 14 days, while observations on hydrogen sulfide production were made at 24 and 48 hours. As is usually the case, carbon utilization was determined after 10 days' incubation.

Microscopic morphology

*Spore chain morphology.*—Sporophores and spore chains are straight to flexuous, with neither spirals nor hooks present. The spores are oval to short cylinders, with dimensions of 0.7 to 1.1 m$\mu$ by 1.4 to 2.2m$\mu$. Electron micrographs of platinum-preshadowed carbon replicas of the spores reveal a relatively smooth spore surface which is covered with a network of interlacing fibril bundles.

Cultural characteristics

*Tomato paste-oatmeal agar.*—Growth is abundant with an abundant pink (3–D7) aerial mycelium. The reverse is red-brown (8–H3). A soluble red-brown pigment is present.

*Nutrient agar.*—Growth is poor with no aerial mycelium. The reverse is yellow (10–F3). No soluble pigment is present.

*Czapek's agar.*—Growth is moderate with a moderate light pink (2–B1) aerial mycelium. The reverse is a light yellow-brown (11–F5). A slight amount of brown soluble pigment is observed.

*Glucose-asparagine agar.*—Growth is scant with no aerial mycelium. The reverse is light yellow-green (19–B1).

*Inorganic salts—starch agar.*—Growth is abundant with an abundant moderate pink aerial mycelium; reverse moderate brown (14–A10). A slight amount of brown soluble pigment is present.

*Yeast extract agar.*—Growth is moderate with a moderate aerial mycelium which is white with a brownish pink margin. The reverse is a dark grayish brown (15–A2); slight brown soluble pigment.

*Bennett's agar.*—Growth is moderate with a moderate grayish yellow-pink (4–B7) aerial mycelium. The reverse is moderate brown (14–A10); slight brown soluble pigment.

*Emerson's agar.*—Growth is moderate but without aerial mycelium. The reverse is moderate orange (10–17). No soluble pigment is seen.

*Calcium malate agar.*—Growth is moderate with moderate yellow-pink (3–D7) aerial mycelium. The reverse is gray-brown; slight brown soluble pigment.

*Tyrosine agar.*—Growth is only fair with no aerial mycelium. The reverse is grayish yellow (12–B2). No soluble pigment is seen.

Physiological characteristics

*Skim milk.*—Coagulation and peptonization is seen.
*Gelatin liquefaction.*—Variable.
*Nitrate reduction.*—Negative.
*Temperature requirements.*—Maximum growth and sporulation are seen between 30 and 37° C. Fair growth and sporulation take place at 43° C. No growth is observed at 50° C.

The results of carbon utilization tests carried out with the A3823-producing strain of *S. cinnamonensis* ATCC 15413 are set forth in the following table. The meaning of the symbols employed to indicate growth response in the table is as follows:

+ = Utilization
(+) = Probable utilization
(−) = Questionable utilization
− = No utilization

| Carbon sources: | Response |
|---|---|
| D(+)-Xylose | + |
| L(+)-Ribose | (+) |
| L(+)-Rhamnose | (+) |
| Dextrose | + |
| Fructose | + |
| Sucrose | (−) |
| Lactose | (−) |
| D(+)-Raffinose | + |
| i-Inositol | + |
| Inulin | (−) |
| Maltose | + |
| Mannitol | + |
| Salicin | + |
| d-Sorbitol | (−) |
| D-ribose | + |
| D(+)-trehalose | + |
| D(+)-mannose | + |

Although this invention is described in detail with particular reference to the newly found organism *Streptomyces cinnamonensis* ATCC 15413, it is to be understood that the production of the A3823 antibiotic complex or of the various factors comprising the said complex by other strains or mutants of the said organism are within the scope of this invention. The proportions of the various A3823 factors produced by such other strains or mutants would not necessarily be the same as herein indicated. Such other strains or mutants can be produced 9.99, 10.08, 10.30, 10.52, 10.66, 10.85, 11.03, 11.25 and 11.48 microns.

Electrometric titration of A3823 factor C in 66 percent aqueous dimethylformamide gives a pK's value of 5.7.

Elemental microanalysis of the sodium salt of antibiotic factor C indicates the following approximate percentage composition: C, 62.67; H, 8.90; O, 25.56 (by difference); Na, 2.87.

Antibiotic A3823 factor D is a crystalline compound containing a carboxylic acid group. The sodium salt of factor D as crystallized from ethyl acetate has a melting point of about 251–252° C.

Mass spectral analysis of this minor factor gives a molecular weight of 684 and indicates that factor D is isomeric with the above described factor C.

Figure 5:
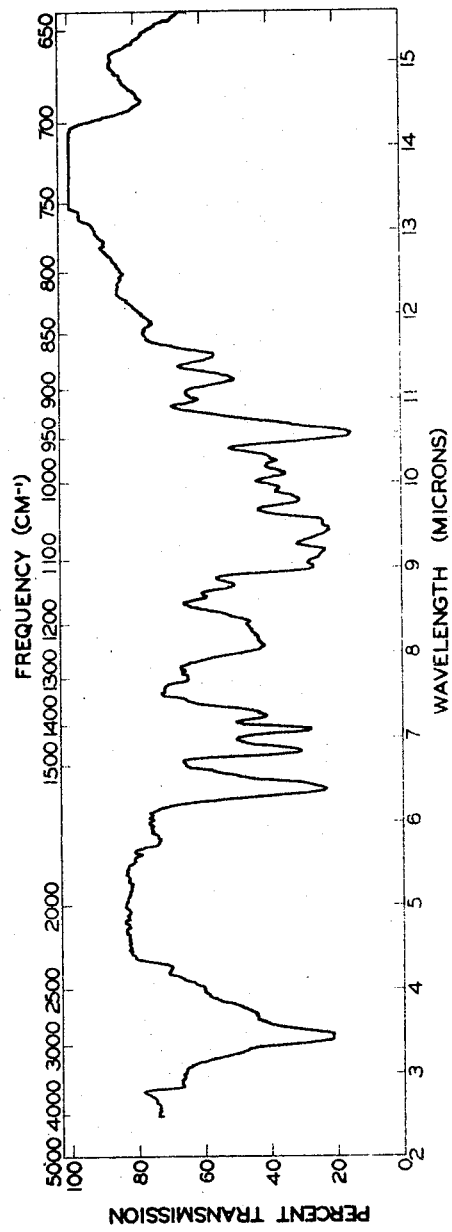

The infrared absorption spectrum of the sodium salt of factor D in chloroform is shown in FIGURE 5 of the drawing. Distinguishable absorption peaks in the spectrum which are significant follow: 3.45, 3.70, 4.04, 4.30, 5.8, 6.42, 6.87, 7.12, 7.39, 7.43, 7.48, 7.72, 7.81, 8.11, 8.41, 8.69, 8.83, 9.04, 9.23, 9.48, 9.57, 9.84, 9.97, 10.13, 10.29, 10.61, 11.02, 11.26, 11.54 and 11.92 microns.

Factor D is soluble in most of the common organic solvents such as the lower alcohols, lower ketones, lower esters, ethers, dimethylformamide, and dimethylsulfoxide. Factor D is highly insoluble in water.

The several factors making up the A3823 complex can be distinguished from each other by thin layer of chromatographic techniques. The preferred method of separation of the four factors of the A3823 complex is by thin layer chromatography on silica gel plates with ethyl acetate as the developing solvent. The factors of the complex are detected by spraying the dried plates with 3 percent vanillin in 1.5 percent ethanolic sulfuric acid and then heating the plates at 100° C. for 5 minutes to develop the characteristic bright red color.

The four antibiotic factors described above comprising the A3823 antibiotic complex are chemically related and qualitatively share the antibiotic properties of the complex. For example, the infrared spectra of the four factors are similar in many respects, and each of the factors is transparent to ultraviolet light.

The relative microbiological activity of the various factors (as sodium salts) against *Bacillus subtilis* (ATCC 6633) is listed below. The test method is the conventional agar diffusion (disc-plate) method with comparison against the standard (crystalline A3823 complex sodium salt) containing 940 μg. of the free acid activity per milligram of sodium salt.

A3823 Factor: Activity, μ/mg.
A ---------------------------------------- 1000
B ---------------------------------------- 425
C ---------------------------------------- 2000
D ---------------------------------------- 1000

The above-indicated activity against *Bacillus subtilis* is indicative of the gram-positive microbiological activity of each of the four factors comprising the antibiotic complex of this invention.

The several antibiotic factors comprising the antibiotic complex A3823 likewise share the ability of preventing the development of coccidiosis in poultry, an important property of the complex. For example, the results of feeding experiments when antibiotic A3823 factor A and antibiotic A3823 factor B are present in the feed of young chickens at levels as low as 0.02 percent show the high effectiveness of these factors in preventing mortality and in decreasing the number of lesions in chicks which have been challenged with coccidia. The results observed with the two factors against the species *Eimeria tenella* and mixed coccidia infections are shown in Table III and Table IV. The mixed infection comprised the following coccidia species: *Eimeria tenella, Eimeria necatrix, Eimeria brunetti, Eimeria maxima, Eimeria acervulina,* *Eimeria mivati, Eimeria hagani, Eimeria praecox.* The weight gain shown is the average weight gain in grams per chicken.

TABLE III.—ACTIVITY OF ANTIBIOTIC A3823 FACTOR A AGAINST *EIMERIA TENELLA* AND MIXED COCCIDIA SPECIES

| Infecting organism | Drug level in feed, percent by weight | No. of Chickens | Mortality, percent | Weight gain, g. |
|---|---|---|---|---|
| *Eimeria tenella* | .02 | 20 | 10 | 122 |
| Control | | 40 | 20 | 66 |
| Do | .02 | 20 | 0 | 129 |
| Control | | 20 | 30 | 89 |
| Mixed | .015 | 20 | 0 | 136 |
| Control | | 20 | 10 | 96 |

TABLE IV.—ACTIVITY OF ANTIBIOTIC A3823 FACTOR B AGAINST *EIMERIA TENELLA* AND MIXED COCCIDIA SPECIES

| Infecting organism | Drug level in feed, percent by weight | No. of Chickens | Mortality, percent | Weight gain, g. |
|---|---|---|---|---|
| *Eimeria tenella* | .02 | 20 | 10 | 108 |
| Control | | 40 | 20 | 66 |
| Mixed | .015 | 20 | 5 | 128 |
| Control | | 20 | 10 | 96 |

In the foregoing tests the level of infection induced was not such as to cause a high incidence of mortality. The significant advantage of administering the described factors to combat coccidiosis is illustrated by the average weight gain per chicken as shown in the last column of Tables III and IV. The data show a dramatic difference in weight gains between treated birds and control birds.

Concentrations of the A3823 factors of about .01 percent and above in the diet of chickens are effective for the control of coccidiosis, however, concentrations of about .02 percent and above are preferable.

The antibiotic A3823 complex or the individual factors thereof, separately or in various combinations, can be employed to control coccidiosis in poultry. The individual A3823 factors or the complex can be administered to chickens in a variety of ways known and understood by those skilled in the art. For example, the A3823 factors or complex can be administered to chickens by incorporation in the diet at concentrations sufficient to control the disease state. Various combinations of known coccidiostats with the individual A3823 factors or complex can also be employed for the control of coccidiosis, as will readily be recognized by those skilled in the art.

The novel antibiotic complex of this invention is produced by culturing a newly discovered strain of an actinomycete organism under aerobic conditions in a suitable culture medium until the culture medium contains substantial antibiotic activity. The antibiotic complex can be recovered by employing various isolation and purification procedures known in the art. These procedures can be employed to obtain the antibiotic complex in relatively pure form. A lesser degree of purification is satisfactory when the antibiotic complex is to be incorporated in a feedstuff for animal use. In such case, the antibiotic need not be recovered as a solid but can, if desired, be sprayed onto the feedstuff or a carrier as a concentrated solution.

The strain of the organism employed for the production of the antibiotic complex of this invention has been placed on permanent deposit with the American Type Culture Collection at Washington, D.C. without restriction as to availability and has been assigned the culture No. ATCC15413. The said strain produces all factors of the antibiotic complex, however under the preferred fermentation conditions A3823 factor A and A3823 factor B predominate.

or obtained by known procedures, for example by subjecting an A3823 producing organism to X-ray or ultraviolet irradiation or to chemical agents such as, for example, the nitrogen mutants.

The culture medium employed to produce antibiotic A3823 complex from *S. cinnamonensis* ATCC 15413 can be any one of a number of media since, as is apparent from the above reported utilization tests, the antibiotic producing organism is capable of utilizing energy from a variety of sources. However, for economy in production, optimal yield, and ease of isolation of the antibiotic, certain culture media are preferred. Thus for example, one of the preferred sources of carbohydrate in the fermentation is molasses, although glucose, fructose, maltose, starch, inositol, and the like can also be employed. Preferred sources of nitrogen are peptones, soybean meal, amino acid mixtures and the like. Among the nutrient inorganic salts which can be incorporated in the culture media are the customary salts capable of yielding sodium, potassium, ammonium, calcium, phosphate, chloride, carbonate, and like ions.

Essential elements necessary for the growth and development of the organism used for the production of A3823 should also be included in the culture medium. Such trace elements commonly occur as impurities in the other constituents of the medium in amounts sufficient to meet the growth requirements of the organism.

The organism employed to produce A3823 is tolerant of considerable variation in the growth conditions. Thus for example, the organism will grow in a variety of media in which the initial pH varies rather extensively. Prior to inoculation of the medium with the organism, however, it is desirable to adjust the pH of the culture medium to between about pH 6.5 and about pH 7.5, depending upon the particular medium employed. As is the case with other actinomyces, the medium gradually becomes more alkaline as the fermentation proceeds and may attain a pH between about pH 7 and about pH 8 or higher during the growth period of the organism while the antibiotic is being produced. The final pH is determined, at least in part, by the initial pH of the medium, the buffers present in the medium, and the length of time for which the organism is permitted to grow.

Submerged aerobic culture in large tanks is preferably employed for the production of substantial amounts of antibiotic A3823 complex, just as for other antibiotics. Small quantities of the antibiotic are conveniently obtained from shake flasks and surface culture in bottles. The fermentation medium in the sterile tank can be inoculated with a sporulated suspension to initiate a fermentation. However, inasmuch as a growth lag is experienced when a sporulated suspension is employed as the inoculum, the vegetative form of the culture is preferred. By avoiding the growth lag in this manner, more efficient utilization of the fermentation equpiment is realized. Accordingly, it is desirable first to produce a vegetative inoculum of the organism by inoculating a relatively small quantity of a culture medium with a spore form of the organism, and when a young, active vegetative inoculum has been obtained, to transfer the vegetative inoculum aseptically into a large fermentation tank. The medium in which the vegetative inoculum is produced can be either the same as or different from the medium utilized for the large scale production of A3823 complex.

The organism which produces A3823 complex will grow over a wide temperature range between about 25° C. to about 45° C. Maximum growth and sporulation, however, occur between about 27° C. to about 37° C., and it is preferred to conduct the fermentation at a temperature between about 27° C. and 30° C.

As is customary in aerobic submerged culture processes, sterile air is blown through the culture medium during fermentation. For efficient growth of the organism and consequent efficient production of A3823, the volume of air employed in the tank production of the antibiotic is preferably upwards of about 0.1 volume of air per minute per volume of culture medium. Most efficient growth and optimal yields of A3823 complex are obtained when the volume of air used is at least one-half volume of air per minute per volume of culture medium, and preferably substantially more.

The concentration of antibiotic activity in the culture medium can readily be followed during the course of the fermentation by testing samples of the culture medium for their inhibitory activity against the growth of an organism known to be inhibited in the presence of this antibiotic. The organisms *Mycobacterium avium* and *Bacillus subtilis* have been found to be suitable for this purpose. The testing of the samples can be carried out by the well-known turbidimetric or cup-plate methods.

In general, maximum production of A3823 complex occurs within about two to five days after inoculation of the culture medium when submerged aerobic culture or shake-flask culture is employed, and within about five to ten days when surface culture is employed.

The antibiotic activity produced during the fermentation of A3823 can occur either in the antibiotic broth or in the mycelium, or in both places. Accordingly, isolation techniques employed in the production of A3823 complex are designed to permit maximum recovery of the antibiotic from either or both sources. Thus for example, the fermentation broth as obtained may be filtered and the filtrate extracted with a suitable solvent to recover the antibiotic activity not retained by the mycelial cake. In addition, the antibiotic present in the mycelial cake is recovered by thorough extraction with a suitable solvent. In either event, the antibiotic can be recovered from the extracting solvent by the ordinary methods commonly employed in the art.

The several factors comprising the antibiotic A3823 complex can, if desired, be obtained as single antibiotics by further purification of the complex by column chromatographic techniques. Chromatography of the complex is possible over a variety of common adsorbents such as silica gel, alumina, carbon and the like, however, silica gel is the preferred material of this invention. Further purification of the factors obtained by column chromatography can be obtained by recrystallization of the respective factors as their sodium salts or as the free acids. Depending upon the relative amounts of the respective factors present in the antibiotic complex obtained from a given fermentation, the separation of the factors can entail repeated column runs. For example, in order to obtain antibiotic A3823 factor D, which commonly occurs in the fermentation as a minor factor, additional column chromatography is usually required to separate it from the other factors, particularly factor C.

In order to illustrate more fully the operation of the invention, the following examples are provided by way of illustration.

Example I

The production of antibiotic complex A3823 in shake-flask cultures is illustrated by the following procedure:

Spores of *Streptomyces cinnamonensis* strain ATCC 15413 were inoculated on a nutrient agar slant made up of 5 g. of casamino acids (acid hydrolyzed casein), 5 g. of glycerol, 5 g. of dextrin, 10 g. of black strap molasses, 5 g. of yeast 2019, 1 g. of $K_2HPO_4$, 5 ml. of a mineral stock solution, 20 g. of agar, and sufficient tap water to make the total volume one liter. (The mineral stock solution contains 100 g. KCl, 100 g. $MgSO_4 \cdot 7H_2O$, 2 g. of $FeSO_4$ and 2 ml. of concentrated hydrochloric acid per liter of solution.) The pH of the spore inoculum medium was adjusted to pH 7.6 to 7.8. The inoculated slant was incubated for about five days at about 30° C., and was then covered with a small amount of sterile distilled water and scraped gently to loosen the organisms and obtain an aqueous suspension thereof.

One milliliter of the suspension so obtained was used to inoculate 100 ml. of a vegetative growth medium having the following composition:

| | G. |
|---|---|
| Cerelose | 15 |
| Soybean meal | 15 |
| Cornsteep solids | 5 |
| Sodium chloride | 5 |
| Calcium carbonate | 2 |
| Water, q.s. to make 1 liter. | |

The medium of this composition was sterilized at a temperature of about 120° C. and a pressure of about 15 p.s.i. for about 30 minutes before being inoculated. The inoculated vegetative growth medium was shaken for about 48 hours at a temperature of about 30° C. on a reciprocal shaker with a 2-inch stroke at a speed of 108 r.p.m.

Five-milliliter portions of the vegetative growth medium obtained as above described were used to inoculate 100-ml. portions of a sterilized production medium contained in 500-ml. Erlenmeyer flasks. The production medium employed had the following composition per liter:

| | G. |
|---|---|
| Cerelose | 10 |
| Brer Rabbit molasses | 20 |
| Peptone | 5 |
| Calcium carbonate | 2 |
| Water, q.s. to make 1 liter. | |

The inoculated production culture was shaken for about five days at a temperature between about 26° C. and 30° C. on a reciprocal shaker as above described. At the end of this time, the contents of a number of shake flasks were pooled and the broth was filtered through a Büchner funnel with the aid of a commercial filter aid. The filtered broth was adjusted to about pH 3 with 5 N hydrochloric acid and was then extracted twice with chloroform. The combined chloroform extracts were concentrated to dryness, the residue was redissolved in chloroform, and the solution was filtered. The filtrate was passed through a 2-cm. by 48-cm. column of 12 by 40 mesh Pittsburgh Cal carbon (an activated carbon sold by Pittsburgh Coke and Chemical Co., Neville Island, Pa.) which had previously been washed with chloroform. The antibiotic filtrate was followed on the column with an additional liter of chloroform. The fractions from the chromatographic column which were shown by assay to contain antibiotic activity were combined and evaporated to dryness, and the residue was dissolved in a solvent mixture comprising 10 parts of methanol to one part of water. The resulting solution containing the antibiotic was warmed and was then set aside in a chill room. Crystallization of the antibiotic complex occurred slowly as some of the methanol evaporated. The crystals were separated in a centrifuge, washed with cold water and dried in a vacuum oven. The antibiotic complex so obtained was recrystallized from an ether-petroleum ether solvent mixture and was dried in vacuo.

Example II

The production of antibiotic complex A3823 on a pilot plant scale is illustrated by the following procedure:

A 2-liter flask containing 800 ml. of a vegetative medium comprising one percent corn starch, 0.5 percent sodium chloride, 0.5 percent peptone, 0.5 percent beef extract, and 0.25 percent yeast extract in distilled water was inoculated with a suspension obtained from a nutrient agar slant culture as described in Example 1. The inoculated vegetative medium was incubated at about 28° C. for 29 hours on a rotary shaker with a 2.5-inch throw, operating at 250 r.p.m. A 50-ml. portion of the vegetative culture so obtained was employed to inoculate a 44-liter seed tank containing a medium which had been sterilized at 120° C. for 30 minutes and which contained one percent soluble starch, 0.5 percent yeast extract, 0.5 percent peptone, 0.5 percent sodium chloride, and 0.5 percent beef extract in water. The seed tank was maintained at a temperature of 28° C. for 24 hours after inoculation. Agitation at the rate of 370 r.p.m. was begun after 8 hours. Aeration at the rate of 0.4 cubic foot of air per minute was carried out for the first 8 hours and was then increased to a rate of 1.4 cubic feet per minute. The seed tank culture was used to inoculate a 250-gal. fermentor containing a sterilized aqueous fermentation medium comprising one percent cerelose, one percent cane molasses, 0.5 percent soybean grits, 0.2 percent calcium carbonate, and 0.02 percent of an antifoam agent. The temperature of the fermentation tank was maintained at about 30° C. throughout the fermentation. Aeration throughout the fermentation was at a rate of 17 cubic feet per minute. Agitation at a rate of 175 r.p.m. was started at six hours and was continued for the duration of the fermentation. Isolation of the antibiotic was carried out as described in Example 3.

Example III

The preparation of a purified concentrate containing antibiotic complex A3823 from a fermentation broth is illustrated by the following procedure:

To 825 liters of whole broth obtained by the procedure described in Example 2 were added 21 kg. of a commercial filter aid. The broth was mixed thoroughly with the filter aid and was then filtered through a 24-inch plate and frame filter. The filter cake was washed on the filter with a quantity of distilled water sufficient to bring the filtrate volume to 825 liters. The filter cake was reserved for further processing to recover additional antibiotic material.

About 550 liters of chloroform were added to the filtrate, and the pH of the mixture was lowered to about pH 3 by the addition of 5 N hydrochloric acid. The aqueous and organic phases were mixed thoroughly for about 30 minutes and were then separated by centrifugation. The spent broth phase was discarded and the chloroform phase was concentrated under vacuum to a volume of about 9450 ml. The chloroform concentrate was then passed through a glass column 4 inches in diameter loaded to a bed level of 66 inches with 12 by 40 mesh Pittsburgh Cal carbon which had been prewashed in the column with 50 liters of chloroform passed through the column at a rate of 500 ml. per minute. The chloroform concentrate containing the antibiotic was passed through the column at a rate of about 200 ml. per minute. The first 4 liters of effluent collected from the column, representing the column hold-up volume, were discarded. The chloroform concentrate was followed on the column with a chloroform wash. About 50 liters of effluent containing antibiotic activity were collected from the column and concentrated under vacuum to a volume of about 370 ml.

Additional antibiotic activity was obtained from the filter cake by twice recycling 70 liters of methanol through the filter press. The spent filter cake was discarded and the combined methanol eluates were concentrated under vacuum to a volume of about 13 liters. About 8.7 liters of chloroform were added to the concentrate, the pH was lowered to about pH 3 by the addition of 5 N hydrochloric acid, and the two phases were mixed thoroughly for about 30 minutes and separated by centrifugation. The spent water phase was discarded and the chloroform phase was concentrated under vacuum to a volume of about 420 ml. The concentrate so obtained was added to that obtained from the broth filtrate and the combined concentrates were employed to prepare crystalline A3823 complex by a crystallization procedure similar to that described in Example 1.

Example IV

Thirty grams of the A3823 complex produced as in Example 1 was dissolved in the sodium salt form in 50 ml. of chloroform and chromatographed over a 6.0 x 85 cm. column containing 1 kg. of silica gel. The silica gel employed was chromatography grade Silica Gel of less than .08 mm. particle size of E. Merck AG. Darmstadt, 9.21, 9.52, 9.82, 9.94, 10.17, 10.29, 10.63, 11.02, 11.26, 11.47, 11.68 and 11.9 microns; and which shows no significant absorption of ultraviolet radiation.

2. The antibiotic A3823 factor B of the formula:

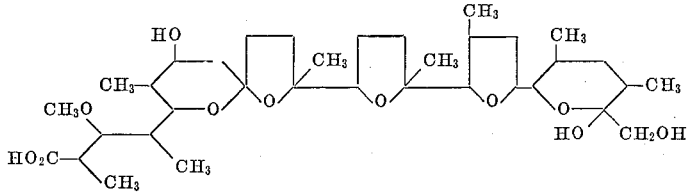

Germany, distributed by Brinkmann Instruments Inc., Cantiague Road, Westbury, L.I., NY. The column was eluted with ethyl acetate. Four hundred and fifty 20 ml. fractions were collected and combined where indicated by thin layer chromatography. The appropriate fractions were dried and evaporated, and the factors were crystallized from acetone-water. Alternatively, crystallization can be achieved from methanol-water, small volumes of ethyl acetate or hydrocarbon solvents. The results of a typical column chromatogram are shown below.

| Fraction No. | Residue weight (g.) | Composition |
| --- | --- | --- |
| 0–95 | 0.0 | |
| 96–98 | 0.1 | A3823 factor C. |
| 99–102 | 0.05 | Mixed factors A, C, D. |
| 103–170 | 11.5 | Factor A. |
| 171–295 | 14.5 | Mixed factor A, B. |
| 296–450 | 3.0 | Factor B. |

Repeated chromatography of those fractions still containing more than one factor afforded further separation of the factors.

The separation of factor C from factor D can also be effected by quantitative thin layer chromatography over silica gel. Eleven mg. of a mixture of the sodium salts of factors C and D were applied to a preparative thin layer chromatography plate and developed three times with ethyl acetate. The silica from the factor D area was removed and eluted with ethanol. Evaporation of the solvent yielded three mg. of pure A3823 factor D sodium salt, melting at about 251–252° C. after recrystallization from ethyl acetate.

The preparative thin layer chromatography plates employed are E. Merck-type pre-coated preparative glass plates having a 2 mm. thickness of Silica Gel F–254 as obtained from Brinkmann Instruments Inc., Cantiague Road, Westbury, L.I., N.Y.

We claim:

1. The antibiotic A3823 factor A of the formula:

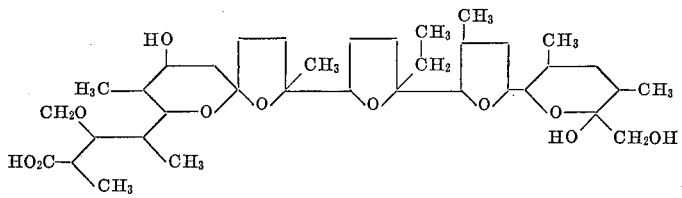

which has a melting point of about 103–105° C.; which has a titratable group of pK′a 6.6 in 66 percent aqueous dimethylformamide; which in the form of its sodium salt has a melting point of about 267–269° C.; which has a molecular weight of 670 as determined by mass spectral analysis of the sodium salt form; which is soluble in the lower alcohols, lower esters, lower ketones, ether, chloroform, dimethylformamide, and dimethylsulfoxide and insoluble in water; which as a solution in chloroform has the following distinguishable bands in its infrared absorption spectrum: 2.76, 3.09, 3.41, 3.69, 3.85, 5.89, 6.03, 6.24, 6.86, 7.03, 7.27, 7.57, 7.67, 7.8, 8.2, 8.70, 8.88, 9.06, which in the form of its sodium salt has a melting point of about 227–228° C.; which has a titratable group of pK′a 5.9 in 66 percent aqueous dimethylformamide; which has a molecular weight of 656 as determined by mass spectral analysis of the sodium salt form; which is soluble in the lower alcohols, lower esters, lower ketones, ether, chloroform, dimethylformamide, and dimethylsulfoxide and insoluble in water; which as a solution of its sodium salt in chloroform has the following distinguishable bands in its infrared absorption spectrum: 2.76, 2.86, 3.41, 3.49, 3.57, 3.74, 6.42, 6.56, 6.90, 7.12, 7.29, 7.34, 7.69, 7.82, 7.92, 8.2, 8.47, 8.68, 8.84, 9.09, 9.18, 9.30, 9.43, 9.51, 9.81, 10.00, 10.17, 10.03, 10.59, 10.77, 11.14, 11.26, 11.48 and 12.03 microns; and which shows no significant absorption of ultraviolet radiation.

3. The antibiotic A3823 factor C which in the form of its sodium salt has a melting point of about 212–214° C.; which has a titratable group of pK′a 5.7 in 66 percent aqueous dimethylformamide; which has a molecular weight of 684 as determined by mass spectral analysis of the sodium salt form; which is soluble in the lower alcohols, the lower esters, the lower ketones, ether, chloroform, dimethylformamide and dimethylsulfoxide and insoluble in water; which as a solution of its sodium salt in chloroform has the following distinguishable bands in its infrared absorption spectrum: 2.74, 2.86, 3.40, 3.48, 3.57, 3.73, 6.27, 6.41, 6.48, 6.57, 6.62, 6.85, 7.12, 7.27, 7.76, 8.2, 8.47, 8.67, 8.83, 9.04, 9.16, 9.29, 9.43, 9.51, 9.79, 9.85, 9.99, 10.08, 10.30, 10.52, 10.66, 10.85, 11.03, 11.25 and 11.48 microns; and which shows no significant absorption of ultraviolet radiation.

4. The antibiotic A3823 factor D which in the form of its sodium salt has a melting point of about 251–252° C.; which has a molecular weight of 684 as determined by mass spectral analysis of the sodium salt form; which is soluble in the lower alcohols, the lower esters, the lower ketones, ether, chloroform; dimethylformamide and dimethylsulfoxide in water; which as a solution of its sodium salt in chloroform has the following distinguishable bands in its infrared absorption spectrum: 3.45, 3.70, 4.04, 4.30, 5.8, 6.42, 6.87, 7.12, 7.39, 7.43, 7.48, 7.72, 7.81, 8.11, 8.41, 8.69, 8.83, 9.04, 9.23, 9.48, 9.57, 9.84, 9.97, 10.13, 10.29, 10.61, 11.02, 11.26, 11.54, and 11.92 microns; and which shows no significant absorption of ultraviolet radiation.

5. The antibiotic A3823 complex, said complex comprising the antibiotic A3823 factor A as defined in claim 1, the antibiotic A3823 factor B as defined in claim 2, the antibiotic A3823 factor C as defined in claim 3, and the antibiotic A3823 factor D as defined in claim 4, said complex being a white solid melting at about 103–106° C., which is soluble in the lower alcohols, lower esters, ketones, chloroform, dimethylformamide, and dimethyl sulfoxide and insoluble in water; which has a titratable group of pK'a=6.65 in 66 percent aqueous dimethylformamide; which has an optical rotation $[\alpha]_D^{25}$ of +47.7° as a one percent solution in methanol; which as a solution in chloroform has the following distinguishable bands in its infrared absorption spectrum: 2.73, 2.98 (shoulder), 3.05, 3.38, 3.47, 5.86, 6.23, 6.83, 7.02, 7.26, 7.56, 7.66, 7.76, 8.04, 9.02, 9.17, 9.47, 9.78, 9.91, 10.06, 10.25, 10.58, 10.82, 10.98, 11.21, 11.44, 11.64, 11.82, and 11.97 microns; and which shows no significant absorption of ultraviolet radiation.

6. A method of producing the antibiotic A3823 complex of claim 5 which comprises cultivating *Streptomyces cinnamonensis* ATCC 15413 in a culture medium containing assimilable sources of carbon, nitrogen, and inorganic salts under submerged aerobic conditions until a substantial amount of A3823 complex is produced by said organism in said culture medium.

7. A method of producing the antibiotic A3823 complex of claim 5 which comprises cultivating *Streptomyces cinnamonensis* ATCC 15413 in a culture medium containing assimilable sources of carbon, nitrogen, and inorganic salts under submerged aerobic conditions until a substantial amount of A3823 complex is produced by said organism in said culture medium and recovering the A3823 complex from said culture medium.

8. A method for obtaining as separate substances antibiotic A3823 factor A as defined in claim 1, antibiotic A3823 factor B as defined in claim 2, antibiotic A3823 factor C as defined in claim 3, and antibiotic A3823 factor D as defined in claim 4 which comprises cultivating *Streptomyces cinnamonensis* ATCC 15413 in a culture medium containing assimilable sources of carbon, nitrogen, and inorganic salts under aerobic conditions until a substantial amount of A3823 complex as defined in claim 5 is produced by said organism in said culture medium, recovering the A3823 complex from said culture medium, absorbing the A3823 complex upon a chromatographic adsorbent and fractionally eluting the separate factors from the absorbent.

No references cited.

ALBERT T. MEYERS, Primary Examiner

DOREA M. STEPHENS, Assistant Examiner

U.S. Cl. X.R.

260—345.9, 347.8; 424—121, 122, 283